Patented Feb. 19, 1952

2,586,555

UNITED STATES PATENT OFFICE 2,586,555

PROCESS FOR PREPARING PYRIDINE CARBOXYLIC ACIDS

Max B. Mueller, Dumont, N. J., assignor to Allied Chemical & Dye Corporation, New York, N. Y., a corporation of New York No Drawing. Application May 18, 1950, Serial No. 162,813

14 Claims. (Cl. 260—295.5)

This invention relates to a process for the oxidation to pyridine carboxylic acids of heterocyclic aromatic nitrogen compounds containing a single pyridine nucleus and having oxidizable hydrocarbon groups only, attached to the pyridine nucleus by at least one carbon-to-carbon linkage, and more particularly it relates to the production of nicotinic acid from certain compounds of this type.

Pyridine carboxylic acids are useful as intermediates in various organic reactions and in the pharmaceutical field. Of these acids, nicotinic acid is a member of the vitamin B complex group, and is useful in the enrichment of foods to improve their nutritional values.

Substituted pyridine and quinoline type compounds of the character described have been oxidized in the past to pyridine carboxylic acids by a number of methods, including oxidation with potassium permanganate; oxidation with nitric acid in a sulfuric acid medium; oxidation with sulfuric acid at high temperatures in the presence of a catalyst, etc.

All of the prior art processes have exhibited certain disadvantages either from the point of view of low yields, slow reaction rates, or the use of expensive or hazardous chemicals.

I have now found that pyridine carboxylic acids may be prepared rapidly and in good yields without the disadvantages of the prior art processes, according to my invention wherein heterocyclic aromatic nitrogen compounds containing a single pyridine nucleus and having at least one oxidizable hydrocarbon group attached to the pyridine nucleus by at least one carbon-to-carbon linkage, dissolved in a concentrated sulfuric acid medium, are oxidized in the liquid phase to pyridine carboxylic acids by perchloric acid, used either alone or in the presence of a catalyst.

As brought out above, the compounds susceptible to oxidation by the process of the present invention are heterocyclic aromatic nitrogen compounds containing a single pyridine nucleus, and having an oxidizable hydrocarbon group or groups attached to the pyridine nucleus by at least one carbon-to-carbon linkage. As examples of such compounds there may be mentioned quinoline, isoquinoline, the picolines or methyl pyridines, such as 2-picoline, 3-picoline and 4-picoline, the lutidines or dimethyl pyridines and γ-collidine or trimethyl pyridine, as well as the methyl quinolines, methyl isoquinolines, etc. If the heterocyclic aromatic nitrogen compound of the character described has an oxidizable hydrocarbon substituent attached to the pyridine nucleus in one beta position only, has no unoxidizable substituent groups and not more than two additional oxidizable hydrocarbon substituents on the pyridine nucleus, each of which is in an alpha position, its oxidation will produce nicotinic acid either directly, as in the case of 3-picoline, or indirectly by the decarboxylation of all but the single beta carboxylic acid group, as in the case of quinoline and the polyalkyl pyridines having only alpha alkyl groups in addition to the single essential beta substituent.

In carrying out the process of my invention, the heterocyclic aromatic nitrogen base compound such as quinoline, 3-picoline, isoquinoline, etc., is mixed with sufficient concentrated sulfuric acid to provide at least a slight excess thereof over that required to form the nitrogen base sulfate, and to maintain such excess during the perchloric acid oxidation reaction. The nitrogen base-sulfuric acid mixture is then subjected in the liquid state to the action of perchloric acid ($HClO_4$) at the particular temperature suitable for converting the particular nitrogen base used to the corresponding desired pyridine carboxylic acid. The conversion of the nitrogen bases to pyridine carboxylic acids under the above conditions takes place at elevated temperatures generally in excess of 100° C., but tends to be irregular at temperatures below about 150° C., for example the reaction taking place slowly for a time and then proceeding with great rapidity, sometimes with explosive force, whereas at temperatures above about 150° C., the reaction proceeds uniformly and smoothly. On the other hand, at temperatures above about 350° C., the components of the reaction mixture become so volatile as to be difficult to retain in the reaction vessel even with the application of pressure. Accordingly, the preferred temperatures for carrying out my invention are usually within the range between about 150° C. and about 350° C. but varying within this range for the particular nitrogen base used and the particular carboxylic acid to be formed. Thus the optimum temperature for the conversion of quinoline to quinolinic acid, i. e. pyridine-2,3-dicarboxylic acid, by perchloric acid in the presence of sulfuric acid lies between about 150° C. and about 190° C.; for converting quinoline to nicotinic acid lies between about 250° C. and about 330° C., preferably between about 310° C. and 320° C.; for converting isoquinoline to cinchomeronic acid, i. e. to pyridine-3,4-dicarboxylic acid, lies between about 280° C. and 285° C.; and for converting 3-picoline to nicotinic acid lies between about 250° C. and about 300° C.

The oxidation reaction is carried out in the liquid phase and under conditions such that virtually no free water is present during the oxidation reaction. However, the use of anhydrous materials is not essential, and I have found that commercially available concentrated sulfuric acids having concentrations of about 95%–96% or even lower concentrations, may be used to convert the nitrogen base to its sulfate and to provide the necessary excess of sulfuric acid. Similarly, aqueous solutions of perchloric acid may be used, even such low concentrations as 20% $HClO_4$, although the preferred acid will be the 70%–72% $HClO_4$ material available commercially. When aqueous materials are used, provision should be made for removal of the water as the temperature is raised prior to and during the oxidation reaction.

The quantity of sulfuric acid used as brought out above should be at least sufficient to convert the nitrogen base into the sulfate and to maintain at least a slight excess thereof during the oxidation reaction. One mol of sulfuric acid per mol of nitrogen base is required for formation of the acid sulfate so that the quantity of sulfuric acid will be in excess of the equimolecular amount. Small excesses, amounting, for example, to only a small fraction of a mol in excess of the stoichiometric quantity are sufficient and will insure maintenance of the necessary liquid phase during the oxidation reaction. However, larger excesses may be used if desired, for example 2 mols or more excess (i. e. a total of 3 or more mols), and are often advantageous to serve as a diluent and reaction medium.

The amount of perchloric acid employed if best yields are desired will be at least that theoretically required to oxidize the particular nitrogen base to the desired acid. Thus for oxidizing an alkyl pyridine compound such as 3-picoline to nicotinic acid, 3 atoms of oxygen are required or an amount of perchloric acid in the ratio of ¾ mol of perchloric acid per mol of 3-picoline. To oxidize a benzopyridine compound such as quinoline, isoquinoline, etc. to a dicarboxylic acid such as quinolinic or cinchomeronic acids, 9 atoms of oxygen are required, or an amount of perchloric acid in the ratio of 2¼ mols of perchloric acid per mol of benzopyridine compound. Quinolinic acid may thereafter be decarboxylated to nicotinic acid if desired by raising the temperature briefly to a point above about 300° C. after a lower temperature oxidation, or by carrying out the oxidation reaction at the higher temperature indicated above, namely, between about 250° C. and about 330° C.

Oxidation of the pyridine base type compound with perchloric acid proceeds at temperatures as low as about 150°–160° C. but is somewhat accelerated by an increase in temperature and by the use of catalysts. Selenium-containing catalysts, such as selenium metal, selenium dioxide or other selenium compound, are especially effective, and a particularly desirable catalyst is a mixture of a selenium compound and an alkali metal bromide, such as sodium or potassium bromide. The amount of catalyst, if used, may vary widely, but generally between about 0.5 and about 25% by weight of N-heteroaryl compound is suitable. The amount of selenium catalyst, when used, may also vary widely but usually an amount of selenium-containing catalyst sufficient to furnish between about .03 and 0.3 gram atom of selenium per mol of N-heteroaryl compound is suitable, and if used in combination with an alkali metal bromide may conveniently be equivalent to from about 0.5 to about 2.0 atoms of selenium per atom of bromine contained in the bromide.

The oxidation may be carried out in any desired manner either as a batch process or as a continuous operation. The rate of the oxidation, however, depends upon the rapidity with which the material can be brought to the reaction temperature and the rapidity with which the excess water can be eliminated. Thus for maximum speed and smoothness of operation, I prefer to carry out the oxidation by first preparing a feed mix containing the nitrogen base to be oxidized, the major portion of the sulfuric acid reaction medium, a portion or all of the catalyst, if employed, and the perchloric acid. This charge is preferably mixed at mildly elevated temperatures, i. e., between about 25° C. and about 100° C., and then is introduced rapidly either dropwise or in a thin stream into a hot zone maintained at the particular reaction temperature desired, the zone containing, if desired, a small quantity of concentrated sulfuric acid. Agitation may be provided in the reaction zone and the reactor is conveniently equipped with means for eliminating water. After complete addition of the charge to the hot zone, the mixture is held in the hot zone for an additional period sufficient to insure completion of the oxidation.

The time necessary for the completion of the reaction will vary somewhat, depending on the efficiency of heat input and water take-off, the proportion of $HClO_4$, the nitrogen compound used, the temperature, and the presence or absence of catalyst. Using only slightly in excess of the stoichiometric equivalent of perchloric acid and between about 2% and about 10% catalyst based on the weight of the nitrogen compound, the reaction is usually complete in a period of not more than about an hour, and often the reaction is complete in an even shorter period.

The pyridine carboxylic acid product obtained as a result of the oxidation may be recovered in any suitable manner. In the case of nicotinic acid, produced in accordance with the preferred embodiment of this invention, the acid reaction mixture containing sulfuric acid, nicotinic acid sulfate and the selenium catalyst may be cooled at room temperature and poured into water or ice; the sulfuric acid may then be partially neutralized with an alkaline material such as ammonia and the selenium precipitate which forms removed by filtration. The pH value of the solution may then be raised to between about 5 and about 7 by adding sufficient alkali, or by adding an excess of ammonia thereto and boiling until the solution becomes acid to litmus, and the nicotinate converted into copper nicotinate by reaction with copper sulfate; the copper nicotinate precipitate may be recovered by filtration and converted by reaction with sodium hydroxide into sodium nicotinate. Nicotinic acid may be recovered from the sodium nicotinate by the addition of an acid such as hydrochloric or sulfuric acid to the sodium nicotinate solution until the pH value thereof is between about 3 and about 4, preferably between about 3.4 and about 3.6, and cooling, since I have found maximum yields of nicotinic acid may thereby be obtained; a Brom Phenol Blue indicator may be used in adjusting the pH value since the neutral point of this indicator to nicotinic acid, i. e. the point at which the indicator just turns yellow, is within the ranges above mentioned. The nicotinic acid may also be recovered by decomposing the copper nicotinate with hydrogen sulfide, separating the copper sulfide and recovering the nicotinic acid from the filtrate. Cinchomeronic acid may be recovered from the reaction mixture resulting from oxidation of isoquinoline as its copper salt substantially as described above or by cooling the oidation mixture, partially neutralizing to a pH of 5 to 7 to precipitate the selenium catalyst, adjusting the pH value of the solution to between 1 and 2, preferably between 1.4 and 1.6 and crystallizing the acid.

The concentrated sulfuric acid used acts primarily as a diluting agent or carrying medium for the perchloric acid oxidizing agent and for the nitrogen base sulfate and not itself as an oxidizing agent, as indicated by the tests described and tabulated below. This series of tests was carried out by subjecting quinoline to the action of sulfuric acid, alone and together with perchloric acid and/or selenium, and to perchloric acid and selenium catalyst in the absence of sulfuric acid at various temperatures within the range employed in the present invention, and for the periods of time indicated. In the runs in which no perchloric acid was used, the durations of the heating times were in excess of times required for completion of the oxidation reaction by the methods of the present invention. Under these conditions, no pyridine carboxylic acid whatever was formed indicating no oxidizing action by the sulfuric acid alone, whereas, under otherwise identical conditions, but using perchloric acid as a constituent of the reaction mass, good yields of quinolinic and nicotinic acids were obtained. When perchloric acid was heated with quinoline and a small quantity of selenium in the absence of sulfuric acid, a violent explosion occurred. The results of these tests are indicated in Table I below:

Table I

[Oxidizing action of various mixtures of perchloric acid, sulfuric acid and selenium on quinoline at various temperatures.]

| Oxidizing Mixture Grams | | | Quinoline Charge Grams | Temp. °C. | Time | Yield Gram Cu Salt |
|---|---|---|---|---|---|---|
| $H_2SO_4$ | $HClO_4$ | Se | | | | |
| | | | | | Minutes | |
| 18 | None | None | 1 | 220-240 | 120 | None. |
| 18 | do | do | 1 | 310-320 | 120 | None. |
| 18 | do | .02 | 1 | 220-240 | 120 | None. |
| 7.5 | 7.5 | None | 1 | [1] 210-215 | 60 | .9 gm.[3] (90%) |
| 7.5 | 7.5 | .02 | 1 | 220 | 30 | .63gm.[4] (63%) |
| None | [2] 22.5 | .5 | 5 | 100+ | 1 | ([5]) |

[1] Heated to 310° C. for 1 to 2 minutes at end of oxidation to convert quinolinic acid to nicotinic acid.
[2] Added as 100 cc. of a 20% aqueous solution and concentrated by heating at 100° C. to 60-70% $HClO_4$ as evidenced by evolution of white fumes.
[3] Nicotinic acid.
[4] Quinolinic acid.
[5] Violent explosion.

The following specific examples will serve further to illustrate the invention. Parts are by weight, except as otherwise indicated.

Example 1

About 46 parts of 95% sulfuric acid were placed in a reaction vessel equipped with stirrer, thermometer, addition funnel and water take-off with air condenser, and heated to 320°-330° C. A mixture of 418 parts of 70% $HClO_4$ (ca. 1.46 mols) and 209 parts of 95% $H_2SO_4$ (ca. 2 mols) with 84 parts (.65 mol) of quinoline, was prepared, heated to about 80° C. and was added dropwise to the hot sulfuric acid in the reaction vessel over a period of 35 minutes. After all the quinoline solution had been added, the charge was heated to 320°-330° C. and maintained at this temperature for an additional 25 minutes. The solution, which was dark brown in color, was cooled, poured over cracked ice and neutralized with sodium hydroxide solution. The mixture was then treated with active carbon, boiled and filtered. The pH was adjusted to about 5, by the addition of acid, and the carbon treatment repeated. The resulting solution was heated to boiling and a solution of 85 parts of $CuSO_4.5H_2O$ was added. A green precipitate of copper nicotinate formed which was filtered, washed and dried overnight. The precipitate amounted to 35 parts, equivalent to a yield of 35% of theory as copper nicotinate.

Example 2

Into a mixing vessel were placed in the order given, 550 parts of 96% sulfuric acid (5.35 mols), 84 parts of quinoline (.65 mol), 7 parts of $SeO_2$ and 65 parts of 70% $HClO_4$ (.45 mol). During the addition of $HClO_4$ the temperature was maintained below 35° C. The above mixture was then added rapidly to a solution of 3 parts of $SeO_2$ in 92 parts of concentrated $H_2SO_4$ maintained at a temperature between 310°-320° C. in a reaction vessel equipped with stirrer, thermometer, addition funnel and water take-off with air condenser. The addition of the charge to the reaction vessel required about 45 minutes. After addition of all the charge, the mixture was further heated at about 320°-325° C. for an additional 5 minutes whereupon the mixture was permitted to cool to room temperature and was then poured over cracked ice. The mixture was then treated as described under Example 1 to recover the nicotinic acid as the copper salt. 73 parts of copper salt was recovered, equivalent to a yield of 73% of theory.

Example 3

A charge was prepared consisting of 60 parts of 3-picoline (.65 mol), 184 parts (1.8 mols) of 96% $H_2SO_4$, and 10 parts of selenium. This charge was placed in a reaction vessel equipped as described under Example 1 and to it were added dropwise 93 parts of 70% $HClO_4$ (.65 mol) obtained by the concentration of 327 parts of 20% $HClO_4$ to the fuming stage, while maintaining the charge at 300° C. No external heating was required to maintain the temperature during the addition of the HClO₄ which was complete in 12 minutes. Thereafter the solution was heated at 300° C. for an additional 3 minutes at the end of which time the solution was light yellow. The reaction mixture was then cooled and the nicotinic acid recovered as the copper salt as described under Example 1. 50 parts of copper nicotinic was recovered, equivalent to a yield of 50% theory.

*Example 4*

A mixture of 184 parts (1.8 mols) of 96% H₂SO₄, 10 parts of selenium, and 5 parts of KBr were placed in a reaction vessel. A feed mix was prepared by adding dropwise to a solution of 460 parts (4.5 mols) of 96% H₂SO₄ and 56.5 parts (.44 mol) of isoquinoline, 140 parts of 70% HClO₄ (equivalent to 9 atoms of oxygen per mol of isoquinoline) while maintaining the temperature below 30° C. The feed mix thus prepared was added dropwise to the catalyst-containing sulfuric acid solution, while maintaining the temperature between 280°–285° C. No external heating was required after addition of the feed mix was started. The addition required 20 minutes. After completion of the mixing, the solution was further heated at 290° C. for an additional 10 minutes, then cooled and treated as described under Example 1 to recover the copper salt of cinchomeronic acid. The yield of the copper salt amounted to 68 parts, equivalent to 68% of theory.

*Example 5*

Into a reaction vessel were placed 550 parts (5.45 mols) of 95% H₂SO₄, 65 parts (½ mol) of quinoline, and 10 parts of selenium. To this solution were added dropwise 248 parts of 20% HClO₄ during a period of 1½ hours, while maintaining the solution at a temperature between 240°–250° C. The reaction vessel was allowed to stand overnight then was again heated to 240°–250° C., and addition of perchloric acid was continued until a total of 562 parts (equivalent to approximately 4½ atoms of oxygen) had been added. The reaction mixture was then treated as described under Example 1 to recover the copper salt of nicotinic acid. The yield of copper salt amounted to 63 parts, equivalent to 82% of theory.

*Example 6*

Into a reaction vessel were placed 56.5 parts of quinoline (.44 mol), 308 parts of 96% H₂SO₄ (3.15 mols) and 10 parts of selenium. The mixture was heated to 150° C. and 140 parts of 70% HClO₄ solution (.98 mol) was added dropwise at such a rate that the temperature was maintained between about 150° C. and 160° C. during the addition. External heating was required to maintain the temperature during the latter part of the addition. The mixing of the above materials required about 1½ hours, whereupon the mixture was heated at 160°–190° C. for an additional 3 hours. At the end of the heating period selenium commenced to sublime from the reaction mixture, indicating that all of the HClO₄ had been used. The reaction mixture was treated as described under Example 1 for recovery of the copper salt of quinolinic acid. The yield of copper salt was 70 parts, equivalent to 70% of theory.

*Example 7*

To a charge of 46 parts of H₂SO₄ and 3 parts of selenium in a reaction vessel was added a mixture of 87 parts (.66 mol) of quinoline, 238 parts of 70% HClO₄ (1.67 mols), and 260 parts of 95% H₂SO₄. The charge in the reaction vessel was heated to 260°–265° C. and the addition of the feed mix was carried out over a period of 35 minutes while maintaining the mixture at the above temperature. The reaction mixture was then heated at 270°–280° C. for an additional 25 minutes, and then treated as described under Example 1 for recovery of copper nicotinate. The yield of copper salt was 63 parts, equivalent to 63% of theory.

While the above describes the preferred embodiments of my invention, it will be understood that departures may be made therefrom within the scope of the specification and claims.

I claim:

1. A process for preparing pyridine carboxylic acids which comprises subjecting a heterocyclic nitrogen compound containing a single pyridine nucleus and having at least one oxidizable hydrocarbon group attached to the pyridine nucleus by at least one carbon-to-carbon linkage, and sulfuric acid to the action of perchloric acid at a temperature between about 150° C. and about 350° C. for a sufficient length of time to convert the heterocyclic nitrogen compound to a pyridine carboxylic acid.

2. A process for preparing pyridine carboxylic acids which comprises subjecting a sulfate of a heterocyclic nitrogen compound containing a single pyridine nucleus and having at least one oxidizable hydrocarbon group attached to the pyridine nucleus by at least one carbon-to-carbon linkage to the action of perchloric acid at a temperature between about 150° C. and about 350° C. for a sufficient length of time to convert the heterocyclic nitrogen compound to a pyridine carboxylic acid.

3. In a process for preparing pyridine carboxylic acids, the steps which comprise preparing a mixture containing perchloric acid, sulfuric acid and a heterocyclic nitrogen compound containing a single pyridine nucleus and having at least one oxidizable hydrocarbon group attached to the pyridine nucleus by at least one carbon-to-carbon linkage, the sulfuric acid being present in proportions in excess of one mol per mol of nitrogen compound, and heating the mixture to a temperature between about 150° C. and about 350° C.

4. In a process for preparing pyridine carboxylic acids, the steps which comprise preparing a mixture containing perchloric acid, sulfuric acid and a heterocyclic nitrogen compound containing a single pyridine nucleus and having at least one oxidizable hydrocarbon group attached to the pyridine nucleus by at least one carbon-to-carbon linkage, the sulfuric acid being present in proportions in excess of one mol per mol of nitrogen compound, the proportion of perchloric acid being at least that theoretically required to oxidize all the said nitrogen compound to pyridine carboxylic acid, and heating the mixture to a temperature between about 150° C. and about 350° C.

5. In a process for preparing pyridine carboxylic acids, the steps which comprise preparing a mixture containing perchloric acid, sulfuric acid, a selenium-containing catalyst and a heterocyclic nitrogen compound containing a single pyridine nucleus and having at least one oxidizable hydrocarbon group attached to the pyridine nucleus by at least one carbon-to-carbon linkage, the sulfuric acid being present in proportions in excess of one mol per mol of nitrogen compound, the proportion of perchloric acid being at least that theoretically required to oxidize all the nitrogen compound to pyridine carboxylic acid, and heating the mixture to a temperature between about 150° C. and about 350° C.

6. In a process for preparing nicotinic acid, the step which comprises heating a mixture of perchloric acid, sulfuric acid and heterocyclic nitrogen compound containing a single pyridine nucleus free of unoxidizable substituent groups on the pyridine nucleus and having an oxidizable hydrocarbon group attached to the pyridine nucleus by a carbon-to-carbon linkage in one beta position only and not more than two additional oxidizable hydrocarbon substituents on the pyridine nucleus of which each is in an alpha position, to a temperature between about 250° C. and about 330° C.

7. In a process for preparing nicotinic acid, the steps which comprise heating a mixture of perchloric acid, sulfuric acid, a selenium-containing catalyst and a heterocyclic nitrogen compound containing a single pyridine nucleus free of unoxidizable substituent groups on the pyridine nucleus, and having an oxidizable hydrocarbon group attached to the pyridine nucleus by a carbon-to-carbon linkage in one beta position only and not more than two oxidizable hydrocarbon additional substituents on the pyridine nucleus of which each is in an alpha position, to a temperature between about 250° C. and about 330° C.

8. In a process for preparing nicotinic acid, the steps which comprise heating a mixture of perchloric acid, sulfuric acid, a catalyst comprising a mixture of a selenum compound and an alkali metal bromide and a heterocyclic nitrogen compound containing a single pyridine nucleus free of unoxidizable substituent groups on the pyridine nucleus, and having an ozidizable hydrocarbon group attached to the pyridine nucleus by a carbon-to-carbon linkage in one beta position only and not more than two oxidizable hydrocarbon additional substituents on the pyridine nucleus of which each is in an alpha position, to a temperature between about 250° C. and about 330° C.

9. The process of claim 6 in which the proportion of sulfuric acid is at least about 3 mols per mol of nitrogen compound and the proportion of perchloric acid is at least that theoretically required to oxidize all the nitrogen compound to pyridine carboxylic acid.

10. In a process for preparing nicotinic acid, the steps which comprise preparing a mixture containing perchloric acid, sulfuric acid and quinoline in the proportions of in excess of one mol of sulfuric acid per mol of nitrogen compound and of at least about 2¼ mols of perchloric acid per mol of quinoline, and heating the mixture to a temperature between about 250° C. and about 330° C.

11. In a process for preparing nicotinic acid, the steps which comprise preparing a mixture containing perchloric acid, sulfuric acid, a selenium-containing catalyst and quinoline in the proportions of in excess of one mol of sulfuric acid per mol of nitrogen compound and at least about 2¼ mols of perchloric acid per mol of quinoline, the selenium catalyst being in an amount sufficient to furnish between about .03 and about 0.3 gram atom of selenium per mol of quinoline, and heating the mixture to a temperature between about 250° C. and about 330° C.

12. In a process for preparing nicotinic acid, the steps which comprise preparing a mixture containing perchloric acid, sulfuric acid, a catalyst comprising a selenium compound and an alkali metal bromide and quinoline in the proportions of in excess of one mol of sulfuric acid per mol of nitrogen compound and at least about 2¼ mols of perchloric acid per mol of quinoline, the selenium catalyst being in an amount sufficient to furnish between about .03 and about 0.3 gram atom of selenium per mol of quinoline, and heating the mixture to a temperature between about 250° C. and about 330° C.

13. In a process for preparing nicotinic acid, the steps which comprise preparing a mixture containing perchloric acid, sulfuric acid, a selenium-containing catalyst and 3-picoline in the proportions of in excess of one mol of sulfuric acid per mol of 3-picoline and at least about ¾ mol of perchloric acid per mol of 3-picoline, the selenium catalyst being in an amount sufficient to furnish between about .03 and about 0.3 gram atom of selenium per mol of 3-picoline, and heating the mixture to a temperature between about 250° C. and about 300° C.

14. In a process for preparing nicotinic acid, the steps which comprise preparing a feed mix containing sulfuric acid, perchloric acid, a selenium-containing catalyst and quinoline, the sulfuric acid being present in an amount in excess of about 3 mols, the perchloric acid being present in an amount equivalent to at least about 2¼ mols, per mol of quinoline, the catalyst being present in an amount sufficient to furnish between about .03 and 0.3 gram atom of selenium per mol of quinoline, introducing said feed mix into a hot zone maintained at a temperature between about 310° C. and about 320° C., heating said mixture in said hot zone for a period of not more than about one hour, and recovering the nicotinic acid thus produced.

MAX B. MUELLER.

REFERENCES CITED

The following references are of record in the file of this patent:

UNITED STATES PATENTS

| Number | Name | Date |
|---|---|---|
| 2,436,660 | Mueller | Feb. 24, 1948 |
| 2,449,906 | Mueller | Sept. 21, 1948 |
| 2,475,969 | Larrison | July 12, 1949 |
| 2,476,004 | Teeters | July 12, 1949 |
| 2,505,568 | Mueller | Apr. 25, 1950 |
| 2,513,099 | Mueller | June 27, 1950 |

OTHER REFERENCES

Smith: Ind. and Eng. Chem. Anal., Ed. 6, pp. 229–230 (1934).

Mallol: Chemical Abs., vol. 43, p. 59 (1949).

Woodward: Ind. and Eng. Chem., vol. 36, No. 6, pp. 544–546 (1944).

Bradstreet: Chem. Reviews, pp. 333–339, vol. 27, 1940.